H. R. SMITH.
Seed Planter.
No. 13,664.
Patented Oct. 9, 1855.
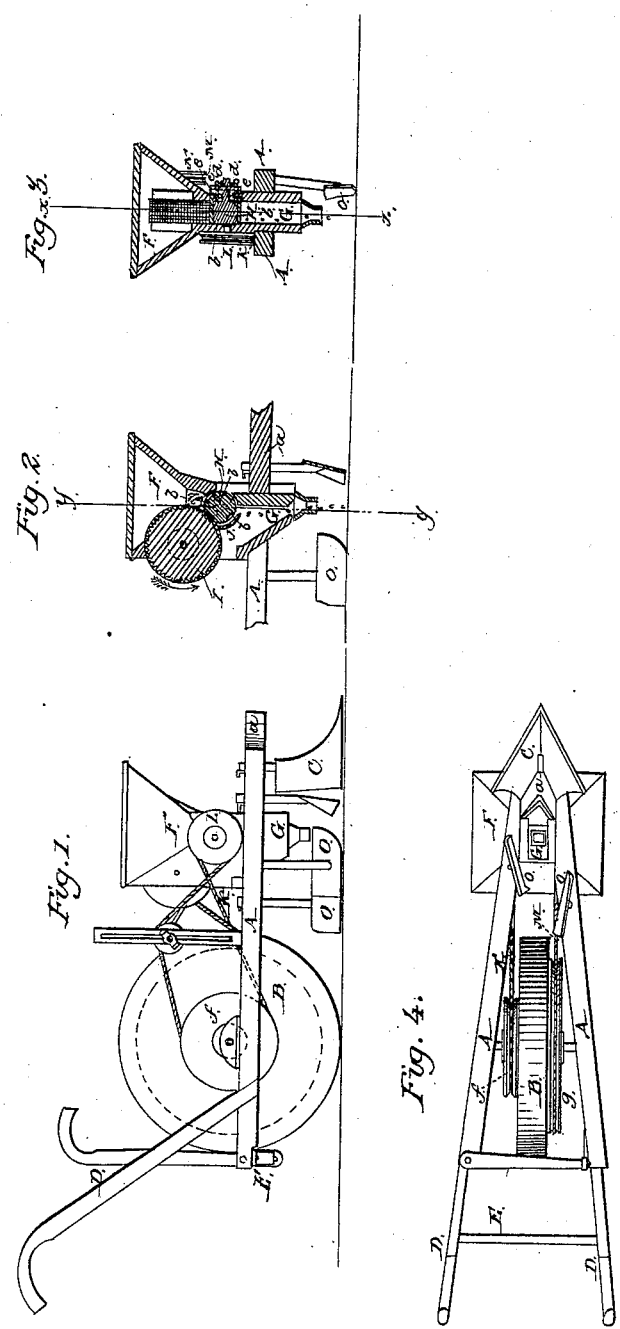

UNITED STATES PATENT OFFICE.

H. R. SMITH, OF MASSENA, NEW YORK.

IMPROVEMENT IN SEEDING-MACHINES.

Specification forming part of Letters Patent No. 13,664, dated October 9, 1855.

*To all whom it may concern:*

Be it known that I, H. R. SMITH, of Massena, in the county of St. Lawrence and State of New York, have invented a new and Improved Seeding-Machine; and I do hereby declare that the following is a full, clear, and exact description of the same, reference being had to the annexed drawings, making a part of this specification, in which—

Figure 1 is a side view of my improvement. Fig. 2 is a detached vertical section of the hopper and distributing device, $x\ x$, Fig. 3, showing the plane of section. Fig. 3 is a transverse vertical section of the same, $y\ y$, Fig. 2, showing the plane of section. Fig. 4 is an inverted plan of my improvement.

Similar letters of reference indicate corresponding parts in the several figures.

The nature of my invention consists in the peculiar means employed for distributing the seed.

A A represent two beams, the front ends of which are connected angularly to a strip, $a$, so that the two beams will be of V form, as shown in Fig. 4. The back parts of the beams are supported by a wheel, B, and to the strip $a$, at the front ends of the beams, there is attached a share, C, formed with two mold-boards. To the back ends of the beams handles D D are attached, and a brake, E, is also attached to the back ends of the beams, which brake may be made to act against the periphery of the wheel B. (See Figs. 1 and 4.)

F is a hopper, which is secured upon the beams A A near their front ends. The lower end of this hopper is provided with a spout, G, which projects a short distance below the beams A A, as shown in Figs. 1, 2, and 3. Within the hopper F there are placed two wheels, H I, one of which, H, is considerably smaller than the other, I. The wheel H extends across the whole width of the lower part of the hopper, and has recesses or holes $b$ made in its periphery. One end of the wheel H has a metallic plate, $c$, attached to it, through which screws $d$ pass horizontally, and the inner ends of these screws are attached to slides $e$, which fit in the recesses or holes $b$ in the wheel H, as shown clearly in Fig. 3. The slides are of the exact depth and width of the recesses or holes $b$, and by turning the screws $d$ the slides may be made to close the recesses or holes $b$ partially or entirely—that is, the portions of the recesses or holes that are within the hopper for one end of the wheel passes through one side of the hopper, as shown in Fig. 3. At the back part of the wheel H there is a concave, J, (see Fig. 2,) the ends of which are secured to the sides of the hopper. This concave is fitted quite closely to the wheel H, but not so as to interfere with its easy rotation. The back part of the wheel I projects through the back side of the hopper F, and is placed rather at one side of the wheel H, its periphery nearly or quite touching the periphery of the wheel H, as shown in Fig. 2. The width of the wheel I corresponds with the portion of the wheel H within the hopper, and the periphery of the wheel I is slightly corrugated. The wheel H is rotated by a cross-band, K, which passes around a circular projection, $f$, on one side of the wheel B, and around a pulley, L, on the journal of the wheel H. The wheel I is rotated by a cross-band, M, which passes around a projection, $g$, on the opposite side of the wheel B, and around a pulley, N, on one of the journals of the wheel I. The arrows in Fig. 2 show the direction in which the wheels rotate.

Directly back of the spout G, and to the beams A A, there are attached two covering-shares, O O. These shares are formed of metal plates, the front ends of which are rounded or curved, as shown in Figs. 1 and 2, and the back upper ends are curved or bent inward, as shown clearly in Figs. 3 and 4 and by the shading in Figs. 1 and 2.

Operation: As the machine is drawn along the wheel B rotates the wheels H I in the direction indicated by the arrows, Fig. 2, and the seed, being placed in the hopper F, will pass into the recesses or holes $b$ in the wheel H, said recesses or holes being made of the desired capacity by turning the screws $d$. The seed is carried around by the roller H underneath the wheel I, which as it rotates serves to crowd or press the seed forward, filling the recesses, and at the same time preventing the choking or clogging of the wheels. The concave J prevents the seed from falling in a scattered manner through the spout G, as it retains the seed in the recesses till they nearly reach a point underneath the center or axis of the wheel. The seeds fall in the furrow made by the share C, and is covered by the shares O O.

By constructing the shares O O as described they are prevented from clogging or becoming entangled with roots and fibrous substances, and by means of the distributing device formed of the wheels H I, arranged and operating as shown, the seed will be distributed properly in the furrow, and may be sown in proper quantities continuously in drills or at intervals in hills by regulating the position of the slides $e$ and by closing some of them entirely, so that only a portion of the recesses or holes $b$ will be open.

The share C may be so regulated as to serve the purpose of a clearer, and an additional share may be used for forming the furrows.

Having thus described my invention, what I claim as new, and desire to secure by Letters Patent, is—

The combination of wheels H I with the hopper F, when arranged substantially as shown, for the purpose specified.

H. R. SMITH.

Witnesses:
HENRY R. HUBBARD,
M. C. BARNES.